April 19, 1932.  A. C. MATHIESON  1,854,709
GOVERNOR DEVICE
Filed June 11, 1929
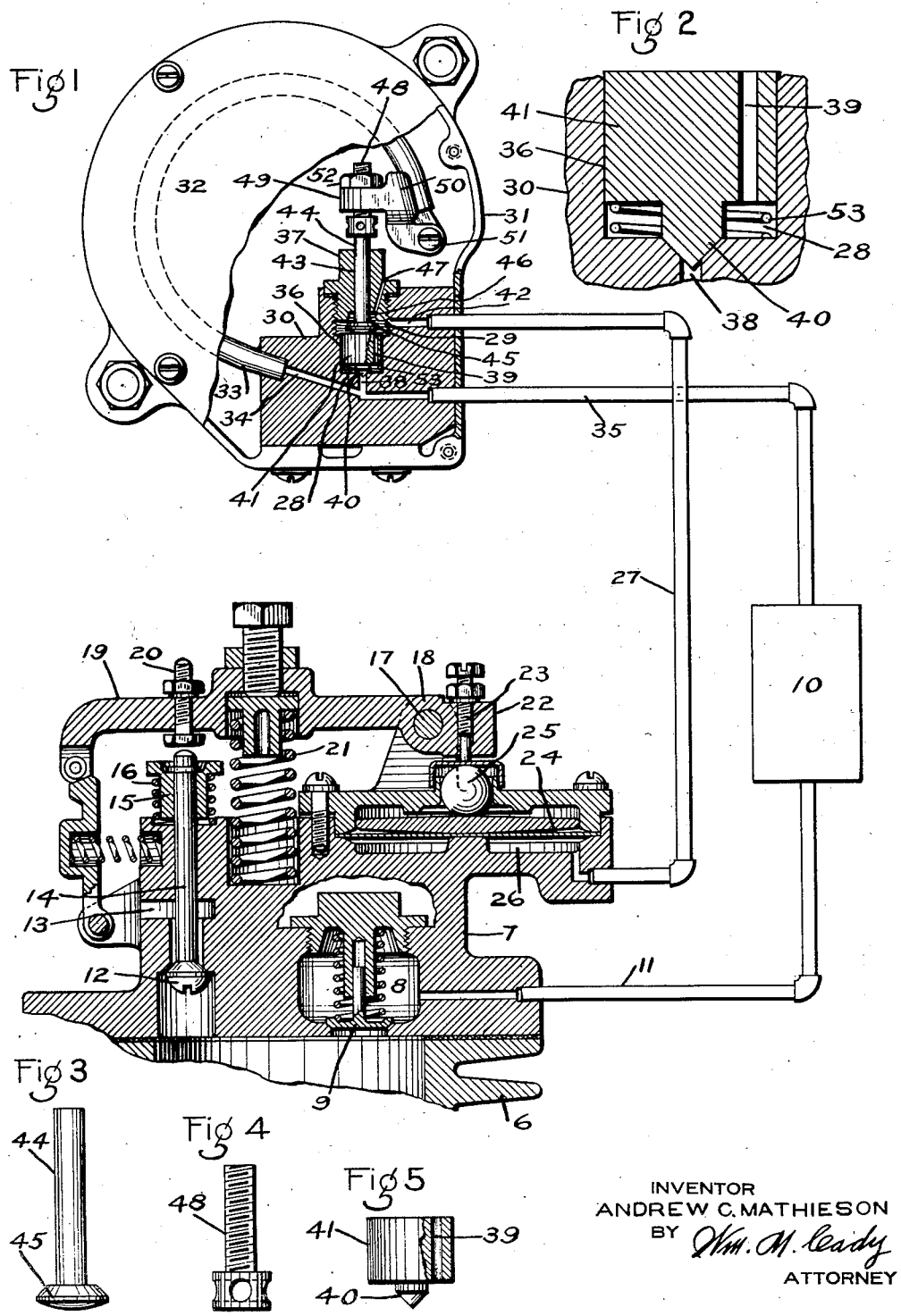
INVENTOR
ANDREW C. MATHIESON
BY *Wm. M. Cady*
ATTORNEY Patented Apr. 19, 1932

1,854,709

UNITED STATES PATENT OFFICE

ANDREW C. MATHIESON, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

GOVERNOR DEVICE

Application filed June 11, 1929. Serial No. 370,120.

This invention relates to fluid compressors and more particularly to means for controlling the loading and unloading of the compressor.

With automotive air brake equipment of the type now in use on heavy vehicles, such as motor trucks and omnibuses, a compressor is coupled directly to the engine for the purpose of maintaining the necessary supply of fluid under pressure in one or more reservoirs, which are used for applying the brakes. Inasmuch as it is the custom to keep the engines of the above-mentioned types of vehicles running continuously, there is a tendency for the reservoirs to become overcharged unless means are provided for unloading the compressors when the pressure of the fluid in the reservoirs attains the predetermined amount.

Heretofore it has been proposed to provide a fluid pressure actuated unloading device for compressors in which is incorporated a flexible diaphragm for operating a lever, which in turn acts on the unloading valve of the compressor to unseat the same, thereby permitting the compressed fluid to pass to the atmosphere.

An object of this invention is to provide a governor device which is adapted to be connected to the unloading mechanism of a compressor and also to the reservoir which is supplied with fluid under pressure by the compressor, so as to automatically effect the operation of the compressor unloading mechanism when the pressure of the fluid in the reservoir exceeds a predetermined amount.

Another object of the invention is to provide a governor device of the above type in which means responsive to the pressure of the fluid in the reservoir are utilized for controlling the operation of valve mechanism adapted to control the communication through which fluid under pressure is supplied to the unloading mechanism from the reservoir when the pressure of the fluid in the reservoir exceeds the predetermined amount.

Another object of the invention is to provide a governor device of the above type in which the communication by which the fluid under pressure from the reservoir is supplied to the unloading valve mechanism of a compressor for the purpose of operating the same, is controlled by a piston valve having a passage therethrough, the piston valve being maintained seated by means which are operated by a Bourdon tube in communication with the reservoir.

Another object of the invention is to provide an improved governor device of the character mentioned which is simple in construction, and reliable and exact in function under all conditions of service.

The invention also comprises certain new and useful improvements in the construction, arrangement, and combination of the several parts of which it is composed, as will be hereinafter more fully described and claimed.

In the accompanying drawings; Figure 1 is a diagrammatic view, mostly in section, of a portion of a fluid compressor and having associated therewith an unloading means and a compressor unloader governor constructed in accordance with the invention; Fig. 2 is an enlarged section of a portion of the governor device shown in Fig. 1, illustrating in detail the piston valve and the spring therefor; and Figs. 3, 4, and 5 are detail views of the exhaust valve, the adjusting screw, and the piston valve respectively.

Referring to the drawings the governor device may be used in connection with a compressor comprising a cylinder 6, shown in part, and having a cylinder head 7 provided with a valve chamber 8, containing the usual discharge valve 9, for controlling communication from the fluid compressor to the usual storage reservoir 10, which is connected to the valve chamber 8 by a passage and pipe 11.

An unloading valve 12 controls communication from the compressing cylinder 6 to an atmospheric port 13 and is provided with an operating stem 14. Carried at the outer end of the stem 14 is a bushing 15 which is subject to the pressure of a coil spring 16 acting through the stem 14 to urge the valve 12 to its seat.

Pivotally mounted on a pin 17 carried by the head 7 is a lever 18 having a long arm 19 provided with an adjustable screw 20 adapted to engage the end of the valve stem 14. A spring 21 interposed between the cylinder head 7 and the arm 19 urges the arm away from the stem 14.

The short arm 22 of the lever 18 carries an adjustable screw 23, to which the movement of a flexible diaphragm 24 is transmitted through a ball 25. The chamber 26 in the cylinder head 7, at one side of the diaphragm 24, is connected to a pipe 27 which leads to the improved governor device for the purpose to be hereinafter more fully described.

The governor device comprises a body 30 which is enclosed by a casing 31 having a removable cover-plate 32.

Mounted in one side of the body 30 is the inner end of a Bourdon tube 33, which is connected to a passage 34 extending through the body to the opposite side thereof.

Connected to the end of the passage opposite to the end having the Bourdon tube, is a pipe 35 which leads to the reservoir 10. In this way fluid under pressure will be supplied to the Bourdon tube 33 from the reservoir 10.

A cavity 36 is formed in the body 30, said cavity extending into the body from one side wall thereof and being threaded for a portion of its length for the reception of a screw-threaded plug 37.

Formed in the wall of the cavity 36 opposite to the plug 37 and disposed in axial alinement with the longitudinal axis of the plug, is a passage 38, which leads to the passage 34 heretofore referred to.

For the purpose of controlling the communication from the passage 38 to the cavity 36, the inner end of the passage 38 is provided with a seat for a valve 40 carried by a piston 41 mounted in the cavity 36.

The piston 41 is formed with a port 39 extending longitudinally therethrough to provide a communication from the chamber 28 on the valve side of the piston to the chamber 29 on the opposite side of said piston. Pipe 27 is connected to chamber 29 by a passage 42.

The inner end or bottom of the plug 37 is spaced a suitable distance from the top or inner portion of the piston 41, so that said piston can move longitudinally in the chamber 29 to permit the valve 40 to unseat for a purpose to be hereinafter described.

The plug 37 is formed with a longitudinal bore 43 which is disposed in axial alinement with the passage 38. This bore constitutes a guide for the stem 44 of a valve 45 contained in chamber 29.

The inner portion of the bore 43 is enlarged to provide a recess 46, and the marginal edge of this recess is shaped to provide a seat for the valve 45.

Extending outwardly through the plug 37 from the recess 46, is a passage 47 which provides an exhaust port through which the chamber 29 is connected to the atmosphere when the valve 45 is unseated. Since the diaphragm chamber 26 is connected to the chamber 29 by passage 42 and pipe 27, this chamber 26 is also connected to the atmosphere, when the valve 45 is unseated.

For the purpose of controlling the operation of the valves 40 and 45, the outer end of the valve stem 44 is adapted to engage the head of an adjusting screw 48, having screw-threaded engagement in the laterally projecting arm 49 of a bracket 50 rigidly mounted, as at 51, to the free end of the Bourdon tube 33. The screw 48 is maintained in its position of adjustment by a lock nut 52.

Assuming that the screw 48 has been adjusted for the pressure at which it is desired to unload the compressor, at all pressures below this pressure, the spring action of the Bourdon tube 33 will exert a downward pressure on stem 44 to hold the valve 45 against the top of the piston 41 and the valve 40 seated against the pressure of the fluid in passage 38 plus the pressure of spring 53 acting on the lower face of piston 41.

When the pressure within the reservoir 10 has increased to a point where the internal pressure in the Bourdon tube 33 plus the pressure acting on the exposed area of the valve 40 exceeds the spring action of the Bourdon tube, the valve 40 will be slightly lifted from its seat, permitting leakage of fluid from pipe 35 into the chamber 28 below the piston 41.

The pressure of fluid from the reservoir 10 will then act on the full area of the piston 41, so as to cause a quick upward movement thereof and thereby causing the valve 45 to seat so as to cut off the communication to the atmosphere from the chamber 29, through the exhaust port 47.

It will be noted that the area of the valve 45 is greater than that of the valve 40, so that although the spring action of the Bourdon tube 33 is increased by its upward movement, the pressure of the fluid in the chamber 28 acting on the piston 41 will be sufficient to hold the valve 45 seated, and the purpose of the spring 53 is to prevent chatter or balancing of the valve piston 41 during the operation of the device.

When the valve 45 is seated, fluid under pressure is supplied from the reservoir 10 through pipe 35 to pipe 27 by the communication through the piston 41 provided by the port 39, and thence to diaphragm chamber 26. The diaphragm 24 is then moved upwardly, so that the lever 18 is actuated to cause the screw 20 to engage and move the stem 14 and thereby unseat the valve 12. The compressing cylinder being then opened to the atmospheric port 13, the compressor operates without compressing fluid into the reservoir 10.

When the fluid pressure in the reservoir 10 has fallen sufficiently to permit the action of the Bourdon tube 33 to overcome the pressure of fluid acting on the under side of the piston 41, the valve 45 will be slightly lifted from its seat and leakage of fluid from chamber 29 through the exhaust port 47 will occur.

The area of the exhaust port 47 is so restricted that the pressure above the piston 41 will build up sufficiently to permit the action of the Bourdon tube 33 to quickly shift the piston 41 so as to cause the valve 40 to seat thereby cutting off the communication from the pipe 35 to the chamber 28.

With the valve 45 unseated, fluid is vented from diaphragm chamber 26 through pipe 27, passage 42, chamber 29 and exhaust port 47 to the atmosphere, so that the pressure of spring 21 acts to shift the arm 19 upwardly, thereby permitting the valve 12 to seat. The compressor then operates to compress fluid into the reservoir 10.

It will be noted that the release valve 45 merely engages the piston 41, so that said valve is free to move relatively to the piston. As a consequence, there will be no tendency for the parts to stick or jam due to inaccuracies in the alinement of the piston 41 and the stem 44, and it will be evident that piston 41 is always free to reciprocate in its bearing and likewise the stem 44.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A device of the class described comprising a body having a cavity formed therein, a piston mounted in said cavity, chambers on opposite sides of the piston, means for supplying fluid under pressure from a reservoir to the chamber on one side of the piston, a valve carried by the piston for controlling the communication through which the fluid is supplied to said chamber, fluid pressure operated means connected to the chamber on the opposite side of the piston, an atmospheric port connected to said second-named chamber for exhausting the fluid in said chamber and said fluid operated means, a valve for controlling said exhaust port, a passage in the piston through which fluid is supplied to the second-mentioned chamber from the first-mentioned chamber when the first-mentioned valve is unseated, and means responsive to the pressure of the fluid in the reservoir for controlling the operation of the piston.

2. A fluid pressure governor device comprising a fluid pressure cylinder, a piston in said cylinder, a valve carried by said piston for controlling the supply of fluid from an inlet passage to a controlling chamber, a valve engageable with and movable relative to said piston for controlling the release of fluid from said chamber, and means responsive to variations in fluid pressure in said inlet passage for controlling the operation of said valves.

3. A fluid pressure governor device comprising a pair of axially alined valves, one for controlling the supply of fluid under pressure from an inlet passage to a control chamber and the other for controlling the release of fluid under pressure from said control chamber, a fluid pressure cylinder, a piston in said cylinder and connected to the supply valve, a steam connected to the release valve, the release valve being engageable with but movable relative to said piston, and means responsive to variations in fluid pressure in said inlet passage for operating said stem.

4. A device of the class described comprising a cylinder, a piston mounted in said cylinder and having a passage extending therethrough, a reservoir communicating with said cylinder on one side of said piston, a fluid pressure responsive device and an exhaust port communicating with said cylinder on the other side of said piston, an inlet valve carried by said piston for controlling communication between said reservoir and said cylinder, an exhaust valve engageable with and separable from said piston for controlling communication between said cylinder and said exhaust port, a spring for urging said piston to a position in which it opens said inlet valve, and a Bourdon tube arranged in communication with said reservoir and responsive to the pressure therein for yieldably maintaining said exhaust valve open and in a position in which said exhaust valve holds said piston depressed against the action of said spring with said inlet valve closed, when the pressure in said reservoir is less than a predetermined amount and for permitting said spring to open said inlet valve when the pressure in said reservoir exceeds a predetermined amount.

5. A fluid pressure governor device comprising a fluid pressure cylinder, a piston in said cylinder, a valve carried by said piston for controlling the supply of fluid from an inlet passage to a controlling chamber, a valve engaging said piston and freely movable transversely of the axis of said piston for controlling the release of fluid from said chamber, and means responsive to variations in fluid pressure in said inlet passage for controlling the operation of said valves.

In testimony whereof I have hereunto set my hand, this 8th day of June, 1929.

ANDREW C. MATHIESON.